(12) United States Patent
Ramasamy et al.

(10) Patent No.: US 11,758,482 B2
(45) Date of Patent: Sep. 12, 2023

(54) DYNAMIC MULTIPLE ANTENNA SENSOR AND WIRELESS POWER MANAGEMENT FOR MULTIPLE RADIO TYPES AND MULTIPLE WIRELESS CONFIGURATIONS

(71) Applicant: Dell Products L.P., Round Rock, TX (US)

(72) Inventors: Suresh Ramasamy, Cedar Park, TX (US); Ching Wei Chang, Cedar Park, TX (US); Lars Fredrik Proejts, Taipei (TW); Ravichandra Rama, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 155 days.

(21) Appl. No.: 17/380,626

(22) Filed: Jul. 20, 2021

(65) Prior Publication Data
US 2023/0025551 A1    Jan. 26, 2023

(51) Int. Cl.
*H04W 52/00* (2009.01)
*H04W 52/14* (2009.01)
*H04L 67/145* (2022.01)

(52) U.S. Cl.
CPC ......... *H04W 52/146* (2013.01); *H04L 67/145* (2013.01)

(58) Field of Classification Search
CPC ........ H04B 10/114; H04B 1/10; H04B 1/034; H04B 17/30; H04B 1/3888; H04B 7/00; H04B 10/564; H04W 52/00; H04W 12/63; G06F 3/044; A61B 5/11; A61B 8/02; H04M 1/72412; H04M 1/38
See application file for complete search history.

(56) References Cited

U.S. PATENT DOCUMENTS

| | | | |
|---|---|---|---|
| 2017/0192478 A1* | 7/2017 | Mercer | G06F 1/1698 |
| 2020/0195289 A1* | 6/2020 | Chang | H04W 52/18 |

* cited by examiner

Primary Examiner — Tu X Nguyen
(74) Attorney, Agent, or Firm — Larson Newman, LLP

(57) ABSTRACT

A method and information handling system (IHS) for dynamic multiple antenna sensor and wireless power management for multiple radio types and multiple wireless configurations comprise enabling, by an antenna controller (AC), a proximity sensor (P-sensor) connected interrupt to be generated by a P-sensor; upon activation of the P-sensor connected interrupt, determining, at the AC, a reason for the P-sensor connected interrupt; when the reason is a steady-state detection event, calibrating, by the AC, the P-sensor; when the reason is a proximity detection event, storing, by the AC, a radio transmit power lookup table, the radio transmit power lookup table mapping a P-sensor channel, an antenna subsystem physical configuration value, and an IHS physical configuration usage mode value to a radio transmit power level value; and configuring, at a radio, the radio to operate at a radio transmit power level corresponding to the radio transmit power level value.

17 Claims, 7 Drawing Sheets

DYNAMIC MULTIPLE ANTENNA SENSOR AND WIRELESS POWER MANAGEMENT FOR MULTIPLE RADIO TYPES AND MULTIPLE WIRELESS CONFIGURATIONS

FIELD OF THE DISCLOSURE

The present disclosure generally relates to information handling systems, and more particularly relates to dynamic multiple antenna sensor and wireless power management for multiple radio types and multiple wireless configurations.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A method and information handling system (IHS) for dynamic multiple antenna sensor and wireless power management for multiple radio types and multiple wireless configurations comprise enabling, by an antenna controller (AC), a proximity sensor (P-sensor) connected interrupt to be generated by a P-sensor; upon activation of the P-sensor connected interrupt, determining, at the AC, a reason for the P-sensor connected interrupt; when the reason is a steady-state detection event, calibrating, by the AC, the P-sensor; when the reason is a proximity detection event, storing, by the AC, a radio transmit power lookup table, the radio transmit power lookup table mapping a P-sensor channel, an antenna subsystem physical configuration value, and an IHS physical configuration usage mode value to a radio transmit power level value; and configuring, at a radio, the radio to operate at a radio transmit power level corresponding to the radio transmit power level value.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
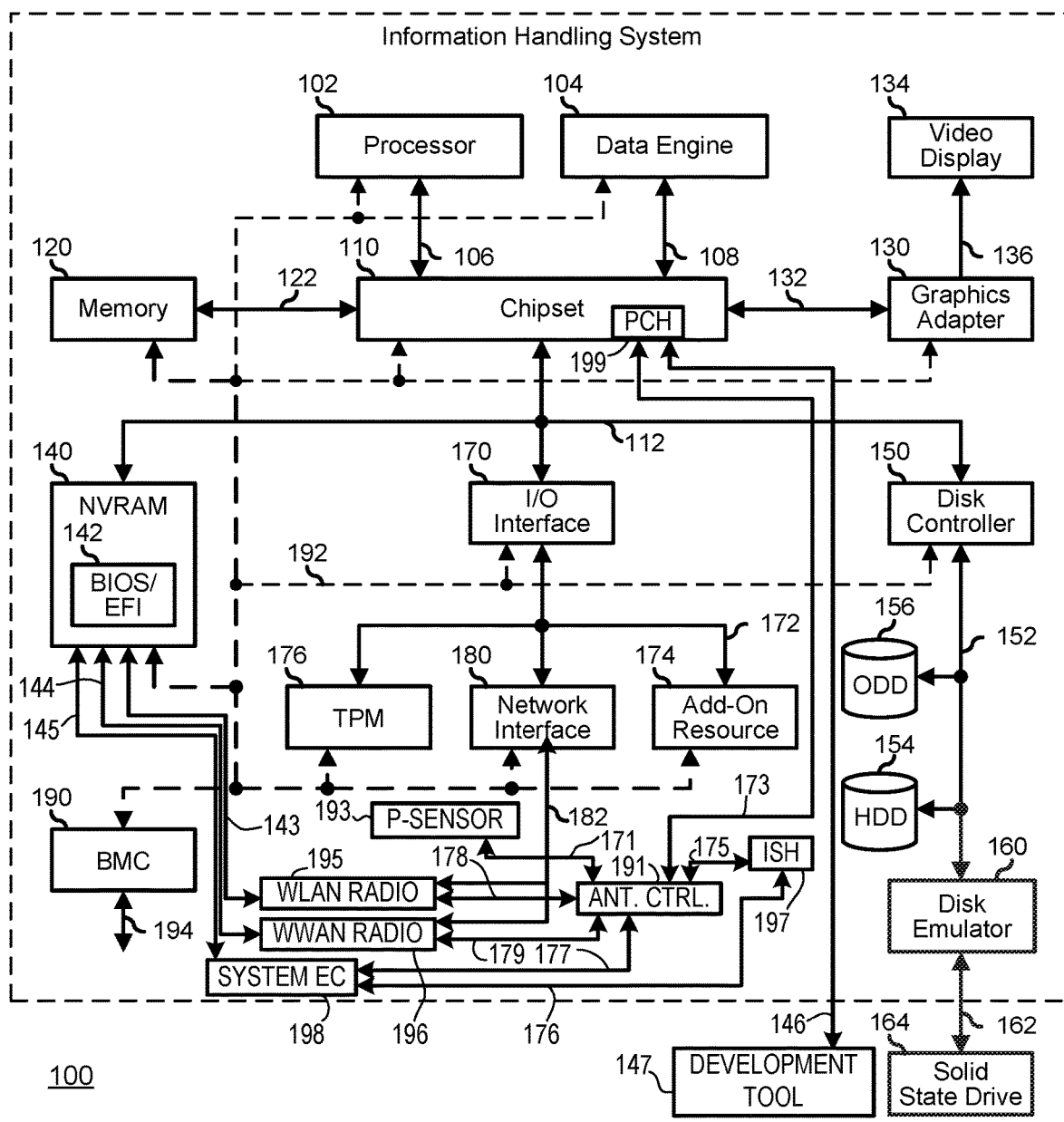
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics adapter 130, include a basic input and output system/extensible firmware interface (BIOS/EFI) module 140, a disk controller 150, a disk emulator 160, an input/output (I/O) interface 170, a network interface 180, baseboard management controller (BMC) 190, antenna controller (AC) 191, proximity sensor (P-sensor) 193, wireless local area network (WLAN) radio 195, wireless wide area network (WWAN) radio 196, integrated sensor hub (ISH) 197, and system embedded controller (EC) 198. Chipset 110 comprises platform controller hub (PCH) 199. Processor 102 is connected to chipset 110 via processor interface 106, and processor 104 is connected to chipset 110 via processor interface 108. Memory 120 is connected to chipset 110 via a memory bus 122. Graphics adapter 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a Serial Peripheral Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channel 182 that can provide an interface to devices that are internal or external to information handling system 100. In a particular embodiment, network channel 182 of a different type than peripheral channel 172 and network interface 180 translates information from a format suitable to the peripheral channel to a format suitable to external devices. An example of network channel 182 includes InfiniBand channels, Fibre Channel channels, Gigabit Ethernet channels, proprietary channel architectures, or a combination thereof. Network channel 182 can be connected to external network resources (not illustrated), either directly or via component such as WLAN radio 195, WWAN radio 196, or both. The network resource can include another information handling system, a data storage system, another network, a grid management system, another suitable resource, or a combination thereof.

BMC 190 is connected by a management interface 192 to a plurality of system components, such as processor 102, processor 104, memory 120, chipset 110, graphics adapter 130, I/O interface 170, disk controller 150, NVRAM module 140, TPM 176, network interface 180, and add-on resource 174. BMC 190 is connected to an external management interface 194 for platform management by an external IHS.

Network interface 180 is connected to WLAN radio 195 and WWAN radio 196 via network channel 182. WLAN radio 195 is connected to antenna controller (AC) 191 via interconnect 178. WWAN radio 196 is connected to AC 191 via interconnect 179. AC 191 is connected to proximity sensor (P-sensor) 193 via interconnect 171. AC 191 is connected to integrated system hub (ISH) 197 via interconnect 175. ISH 197 is connected to system embedded controller (EC) 198 via interconnect 176. AC 191 is connected to system EC 198 via interconnect 177. System EC 198 is connected to NVRAM 140 comprising BIOS/EFI 142 via interconnect 145. NVRAM 140 is connected to WLAN radio 195 via interconnect 143. NVRAM 140 is connected to WWAN radio 195 via interconnect 144. AC 191 is connected to platform controller hub (PCH) 199 via interconnect 173. PCH 199 can be connected to a development tool 147 via interconnect 146. Elements within IHS 100 can be implemented as described using similar names with respect to elements shown on other drawings described below.

Figure 2:
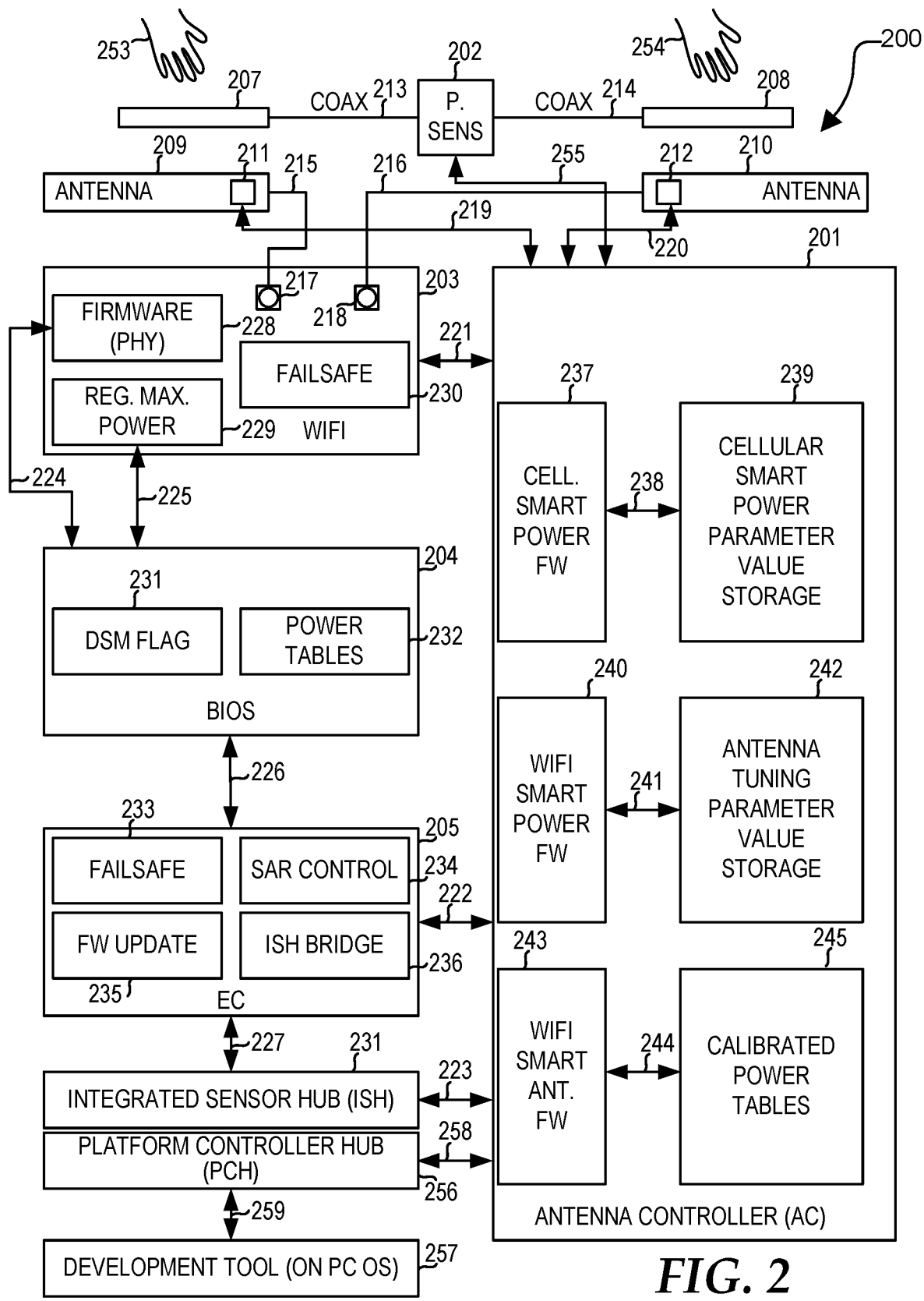
FIG. 2 is a block diagram illustrating a system for dynamic multiple antenna sensor and wireless power management for multiple radio types and multiple wireless configurations according to an embodiment of the present disclosure.

FIG. 2 shows a system for dynamic multiple antenna sensor and wireless power management for multiple radio types and multiple wireless configurations according to an embodiment of the present disclosure. System 200 includes AC 201, proximity sensor (P-sensor) 202, WLAN radio (for example WiFi radio, where WiFi refers to the Institute of Electrical and Electronics Engineers 802.11 wireless local area network standard) 203, basic input/output system (BIOS) 204, system EC 205, integrated sensor hub (ISH) 231, platform controller hub (PCH) 256, development tool 257, proximity sensing conductor 207, proximity sensing conductor 208, antenna 209, and antenna 210. In the case of active antennas, antenna 209 can include antenna tuning circuit 211, and antenna 210 can include antenna tuning circuit 212.

AC 201 includes cellular smart power firmware block 237, cellular smart power parameter value storage block 239, WLAN radio smart power firmware block 240, antenna tuning parameter value storage block 242, WLAN radio smart antenna firmware block 243, and calibrated power tables block 245. WLAN radio 203 includes firmware block 228 for the radio physical interface (PHY), regulatory maximum power value storage block 229, failsafe block 230, antenna connector 217, and antenna connector 218. BIOS 204 includes device-specific method (DSM) flag block 231 and power tables block 232. System EC 205 includes failsafe block 233, specific-absorption-rate (SAR) control block 234, firmware update block 235, and ISH bridge block 236. As an example, SAR control block 234 can be implemented as a finite state machine (FSM) for handling P-sensor-related events. As an example, SAR control block 234 can be implemented to track switching of states of operation in response to triggering of P-sensor 202 and ending of the triggering. When proximity of a portion of a body of a user, such as hand 253, is sensed near proximity sensing conductor 207, located near antenna 209, P-sensor 202, which is electrically connected to proximity sensing conductor 207 via interconnect 213, can provide proximity sensing information to AC 201 via interconnect 255. AC 201 can provide an output, such as the proximity sensing information or radio transmit power level control information to EC 205 via interconnect 222. SAR control block 234 can track a state for operation of radio 203 based, at least in part, on the triggering of P-sensor 202 or the ending of the triggering. As an example, even in the event of a failure involving AC 201, EC 205 can use the state information of SAR control block 234 to communicate control information to BIOS 204 via interconnect 226, and BIOS 204 can provide to radio 203 via interconnect 225 a radio transmit power level value from power tables block 232 to control a radio transmit power level of radio 203, assuring continued radio operation in regulatory compliance (e.g., a SAR limit) even during a failure event. As one example, BIOS 204 can provide a particular radio transmit power level value from power tables block 232 to radio 203. As another example, BIOS 204 can provide a power table of a plurality of radio transmit power level values from power tables block 232 to radio 203. In accordance with at least one embodiment, failsafe block 233 of EC 205, failsafe block 230 of radio 203, or both, can provide a failure notification, for example, upon cessation of reception of a heartbeat message between AC 201 and EC 205 or between AC 201 and radio 203, respectively. The failure notification can be communicated among elements that have not failed, for example, among radio 203, BIOS 204, and EC 205. Thus, for example, while SAR control block 234 can maintain state information based on an output of AC 201 that can be based on proximity sensing information obtained from P-sensor 202, EC 205 can disregard the state information of SAR control block 234 as possibly stale and inaccurate when a failure of AC 201 is suspected and can instead utilize failsafe features, such as a failsafe block, to control a radio transmit power level of radio 203 during a failure event.

P-sensor 202 provides proximity sensing using proximity sensing conductor 207 and proximity sensing conductor 208. Proximity sensing conductor 207 is located proximate to antenna 209. Proximity sensing conductor 208 is located proximate to antenna 210. P-sensor 202 can use proximity sensing conductor 207 to detect the presence of a user (for example a portion of a body of a user, such as hand 253) in proximity to proximity sensing conductor 207, and thus in proximity to antenna 209. P-sensor 202 can use proximity sensing conductor 208 to detect the presence of a user (for example a portion of the body of a user, such as hand 254) in proximity to proximity sensing conductor 208, and thus in proximity to antenna 210.

AC 201 is connected to P-sensor 202 via interconnect 255. P-sensor 202 is connected to proximity sensing conductor 207 via interconnect 213, which may, for example, be a coaxial cable or a stripline, such as a microstrip, transmission line. P-sensor 202 is connected to proximity sensing conductor 208 via interconnect 214, which may, for example, be a coaxial cable or a stripline, such as a microstrip, transmission line. AC 201 is connected to antenna tuning circuit 211 via interconnect 219. AC 201 is connected to antenna tuning circuit 212 via interconnect 220. Antenna connector 217 is connected to antenna 209 via interconnect 215, which may, for example, be a coaxial cable or a stripline, such as a microstrip, transmission line. Antenna connector 218 is connected to antenna 210 via interconnect 216, which may, for example, be a coaxial cable or a stripline, such as a microstrip, transmission line. Proximity sensing conductor 207 is located proximate to antenna 209 and is sensitive to the presence of a user (for example, a portion of a body of the user), such as hand 253, proximate to proximity sensing conductor 207, and thus proximate to antenna 209. Proximity sensing conductor 208 is located proximate to antenna 210 and is sensitive to the presence of a user (for example, a portion of a body of the user), such as hand 254, proximate to proximity sensing conductor 208, and thus proximate to antenna 210.

WLAN radio 203, for example, firmware block 228 for the radio physical interface, is connected to BIOS 204 via interconnect 224. WLAN radio 203, for example, regulatory maximum power value storage block 229, is connected to BIOS 204 via interconnect 225. BIOS 204 is connected to system EC 205 via interconnect 226. System EC 205 is connected to ISH 206 via interconnect 227. AC 201 is connected to WLAN radio 203 via interconnect 221. AC 201 is connected to system EC 205 via interconnect 222. AC 201 is connected to ISH 231 via interconnect 223. AC 201 is connected to PCH 256 via interconnect 258. PCH 256 is connected to development tool 257 via interconnect 259.

Cellular smart power firmware block 237 is connected to cellular smart power parameter value storage block 239 via interconnect 238. WiFi smart power firmware block 240 is connected to antenna tuning parameter value storage block 242 via interconnect 241. WiFi smart antenna firmware block 243 is connected to calibrated power tables block 245 via interconnect 244.

Figure 3:
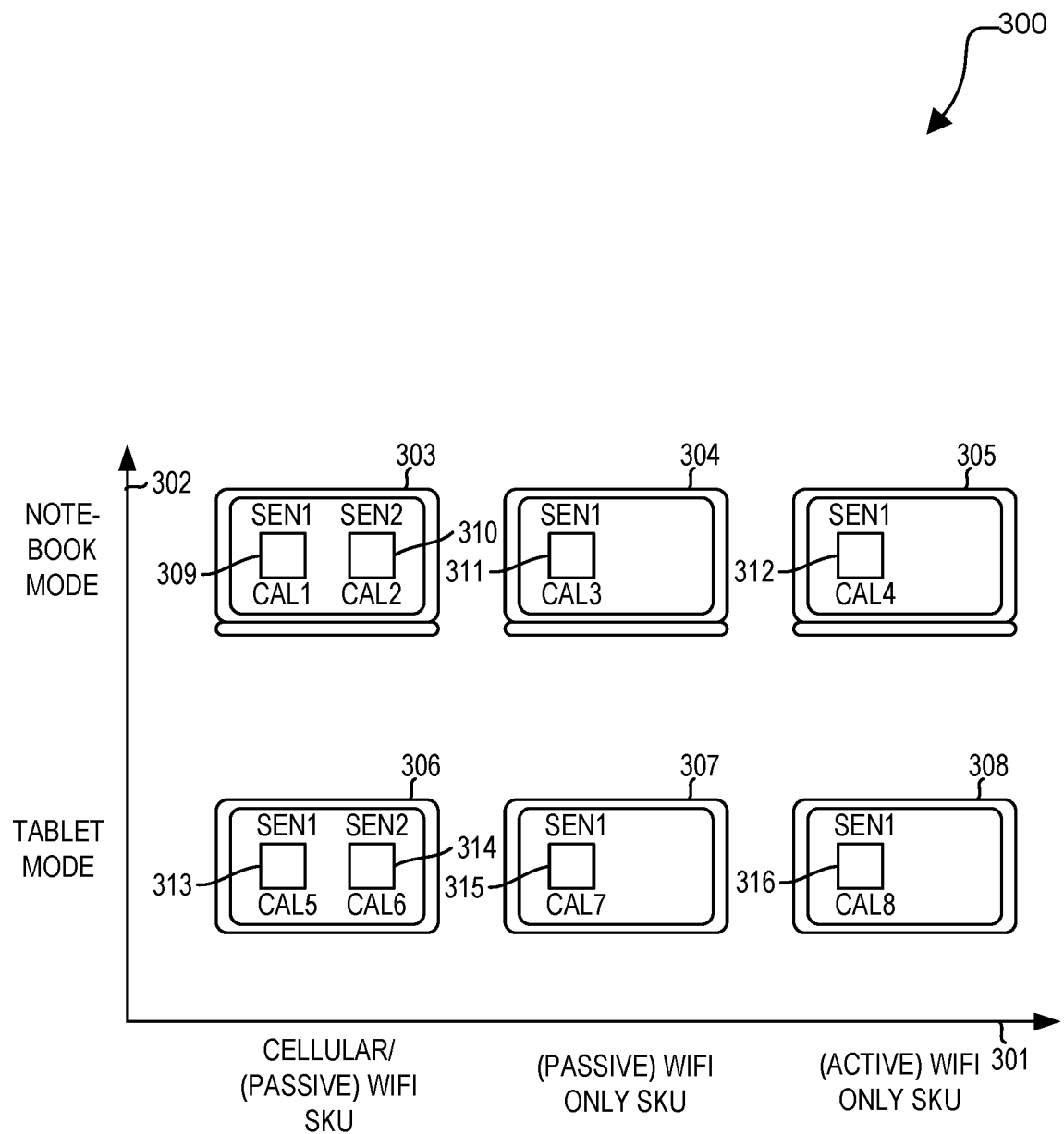
FIG. 3 is a block diagram illustrating an array of exemplary possible IHS modes and wireless subsystem configurations according to an embodiment of the present disclosure.

FIG. 3 shows an array of exemplary possible IHS modes and wireless subsystem configurations according to an embodiment of the present disclosure. Positions along horizontal axis 301 represent different antenna configurations as installed, referred to as antenna SKUs, with a SKU for a cellular antenna and a passive WiFi antenna in the left column, a SKU for a passive WiFi antenna in the center column, and a SKU for an active WiFi antenna in the right column. IHS platforms can support active and passive WLAN antenna configurations (which can be referred to by their respective stock keeping units (SKUs), where, for example, one SKU may represent a WLAN antenna configuration for basic operation and another SKU may represent a WLAN antenna configuration with more advanced features), and several of such WLAN antenna configurations can be supported under a single BIOS. As an example, each SKU can represent a specific model of a part or a plurality of parts that may be installed to provide a respective particular hardware configuration of an IHS or a subsystem of an IHS.

Positions along vertical axis 302 represent different usage modes, with a notebook usage mode in the upper row and a tablet mode in the lower row. IHS 303, illustrated as a notebook IHS, which has both a cellular antenna and a passive WiFi antenna, includes a first sensor 309 for use with a first calibrated power table and a second sensor 310 for use with a second calibrated power table. IHS 304, illustrated as a notebook IHS, which has a passive WiFi antenna, includes a first sensor 311 for use with a third calibrated power table. IHS 305, illustrated as a notebook IHS, which has an active WiFi antenna, includes a first sensor 312 for use with a fourth calibrated power table. IHS 306, illustrated as a tablet IHS, which has both a cellular antenna and a passive WiFi antenna, includes a first sensor 313 for use with a fifth calibrated power table and a second sensor 314 for use with a sixth calibrated power table. IHS 307, illustrated as a tablet IHS, which has a passive WiFi antenna, includes a first sensor 315 for use with a seventh calibrated power table. IHS 308, illustrated as a tablet IHS, which has an active WiFi antenna, includes a first sensor 316 for use with an eighth calibrated power table.

Figure 4:
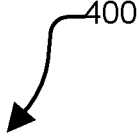
FIG. 4 is a tabular diagram illustrating an array of exemplary possible wireless subsystem configurations, IHS modes, and radio transmit power levels for multiple antennas according to an embodiment of the present disclosure.

FIG. 4 shows an array of exemplary possible wireless subsystem configurations, IHS modes, and radio transmit power levels for a plurality of antennas according to an embodiment of the present disclosure. Table 400 includes columns 401 through 405, with rows across the columns. Column 401 shows a binary flag as to whether or not a particular configuration (for example SKU) supports fourth-generation (4G) long-term-evolution (LTE) wireless communication but not fifth-generation (5G) LTE wireless communication. Column 402 shows a binary flag as to whether or not a particular configuration (for example SKU) supports 5G LTE wireless communication. Column 403 shows a description of a device mode. Column 404 shows an indicated power table for a main antenna. Column 405 shows an indicated power table for a second (for example multiple-input-multiple-output (MIMO) second antenna or 5G LTE transmit antenna (MIMO2/SG TX ANT)).

The exemplary table 400 includes eight rows of entries under the heading row. The first row shows a main LTE transmit antenna with no proximity sensing to be a 4G SKU, with a full-power power table indicated for the main antenna and with no applicability of a MIMO2/5G TX ANT. The second row shows a main LTE transmit antenna with proximity sensing to be a 4G SKU, with a power table for specific-absorption-rate (SAR) power reduction based on the proximity sensing for the main antenna and no applicability of a MIMO2/5G TX ANT. The third row shows a 5G SKU with no proximity sensing for any antenna, showing both the main antenna and the MIMO2/5G TX ANT to use a full-power power table. The fourth row shows a 5G SKU with proximity sensing on the main LTE transmit antenna, with indications for a SAR power table for the main antenna and a full-power power table for the MIMO2/5G TX ANT.

The fifth row shows a 5G SKU with proximity sensing on the MIMO2/5G TX ANT but not on the main antenna, with indications for a full-power power table to be used for the main antenna and a SAR power table to be used for the MIMO2/5G TX ANT. The sixth row shows a 5G SKU with proximity sensing on both the main LTE antenna and the MIMO2/5G TX ANT, with indications for a SAR power table to be used for both antennas. A seventh row shows a lid-closed-mode for a 4G SKU, with an indication for a full-power power table for the main antenna and no applicability of a MIMO2/5G TX ANT. An eighth row shows a lid-closed-mode for a 5G SKU, with indications for a full-power power table to be used with both the main antenna and the MIMO2/5G TX ANT.

Figure 5:
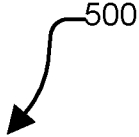
FIG. 5 is a tabular diagram illustrating an array of exemplary possible sensor input values, IHS modes, and radio transmit power levels for multiple antennas according to an embodiment of the present disclosure.

FIG. 5 shows an array of exemplary possible sensor input values, IHS modes, and radio transmit power levels for a plurality of antennas according to an embodiment of the present disclosure. Table 500 includes columns 501 through 505, with rows across the columns. Column 501 indicates the existence of a hinge sensor capable of detecting a position of a hinge of an IHS to determine a physical configuration usage mode of the IHS. Column 502 indicates the existence of a sensor in a click pad capable of detecting a physical configuration usage mode of the IHS. Column 503 provides a description of the device mode. Column 504 indicates a power table to be used with a first WiFi antenna. Column 505 indicates a power table to be used with a second WiFi antenna.

The exemplary table 500 includes nine rows of entries under the heading row. The first row shows a device mode of a tablet mode with proximity sensing triggered for both antennas, with both hinge sensing and click pad sensing, with indications that a SAR power table, specifically a tablet-mode SAR power table, should be used for both antennas. The second row shows a device mode of a notebook mode with proximity sensing triggered for both antennas, with both hinge sensing and click pad sensing, with indications that a SAR power table, specifically a notebook-mode SAR power table, should be used for both antennas.

The third row shows a device mode of a tablet mode with proximity sensing triggered for the second antenna but not the first antenna, with hinge sensing but not click pad sensing, with indications that a full-power power table, specifically a tablet-mode full-power power table, should be used with the first antenna and that a SAR power table, specifically a tablet-mode SAR power table, should be used with the second antenna. The fourth row shows a device mode of a notebook mode with proximity sensing triggered for a second antenna but not for a first antenna, with hinge sensing but not click pad sensing, with indications that a full-power power table, specifically a notebook-mode full-power power table, should be used with the first antenna and that a SAR power table, specifically a notebook-mode SAR power table, should be used with the second antenna.

The fifth row shows a device mode of a tablet mode with proximity sensing triggered for the first antenna but not the second antenna, with hinge sensing but not click pad sensing, with indications that a SAR power table, specifically a tablet-mode SAR power table, should be used with the first antenna and that a full-power power table, specifically a tablet-mode full-power power table, should be used with the second antenna. The sixth row shows a device mode of a notebook mode with proximity sensing triggered for a first antenna but not for a second antenna, with hinge sensing but not click pad sensing, with indications that a SAR power table, specifically a notebook-mode SAR power table, should be used with the first antenna and that a full-power power table, specifically a notebook-mode full-power power table, should be used with the second antenna.

The seventh row shows a device mode of a tablet mode with no proximity sensing triggered for either the first or the second antenna, with hinge sensing and click pad sensing, with indications that a full-power power table, specifically a tablet-mode full-power power table, should be used with both the first antenna and the second antenna. The eighth row shows a device mode of a notebook mode with no proximity sensing triggered for either the first or the second antenna, with hinge sensing and click pad sensing, with indications that a full-power power table, specifically a notebook-mode full-power power table, should be used with both the first antenna and the second antenna. The ninth row shows a device mode of a lid-closed mode, with hinge sensing and click pad sensing, with indications that a full-power power table, specifically a notebook-mode full-power power table, should be used with both the first antenna and the second antenna.

Figure 6:
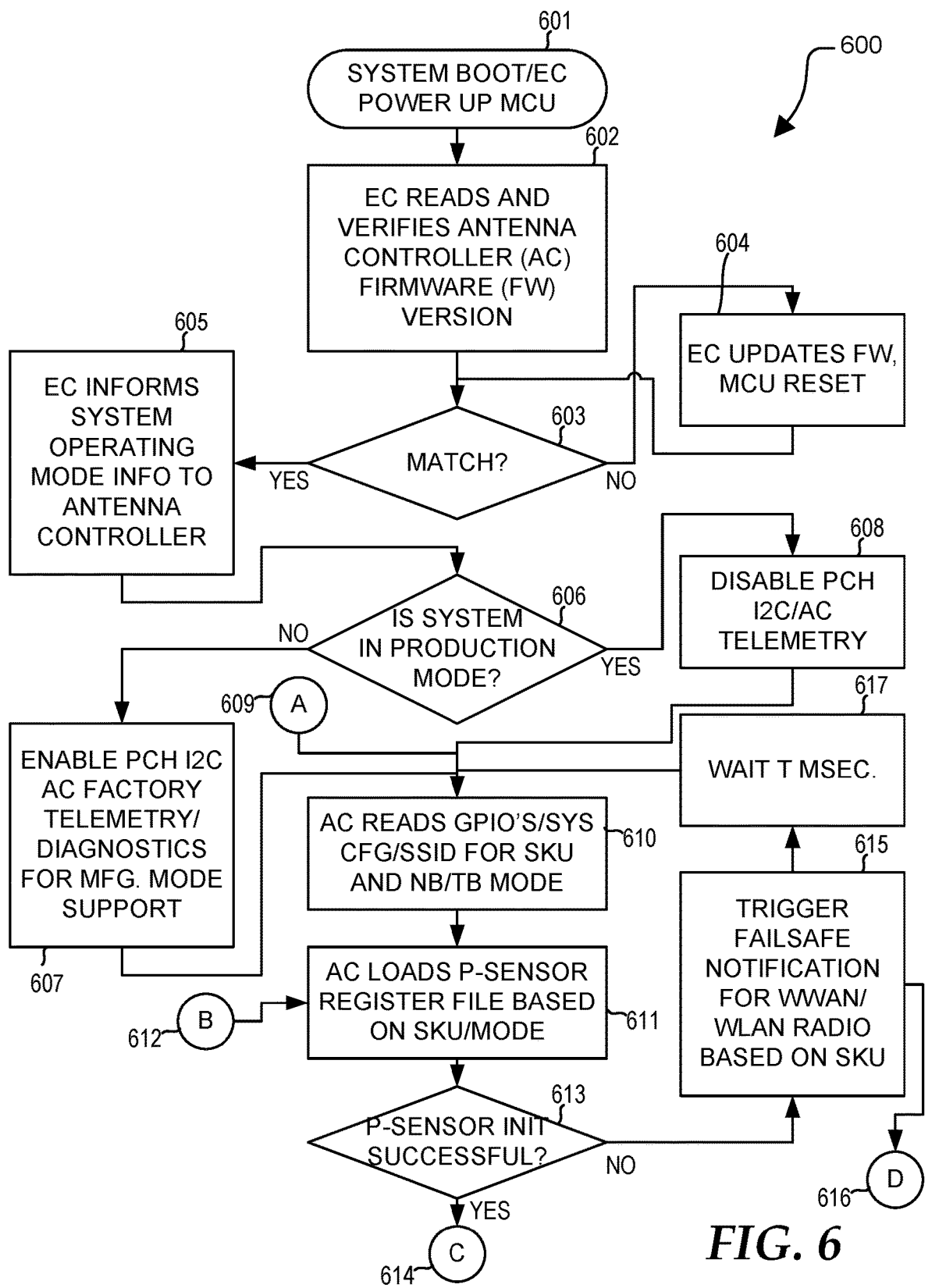
FIGS. 6, 7, and 8, taken together, are a flow diagram illustrating a method for dynamic multiple antenna sensor and wireless power management for multiple radio types and multiple wireless configurations according to an embodiment of the present disclosure.
Figure 7:
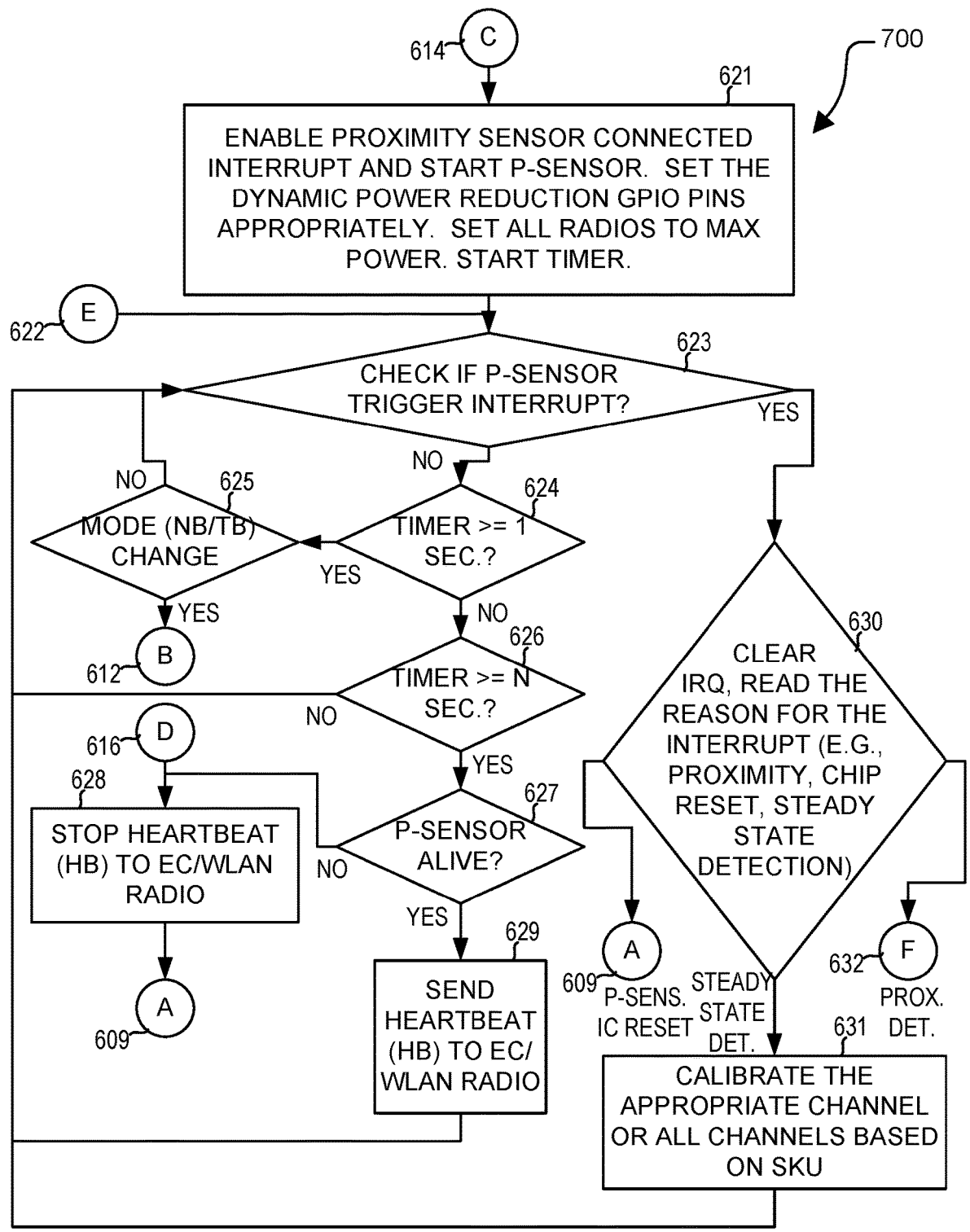
Figure 8:
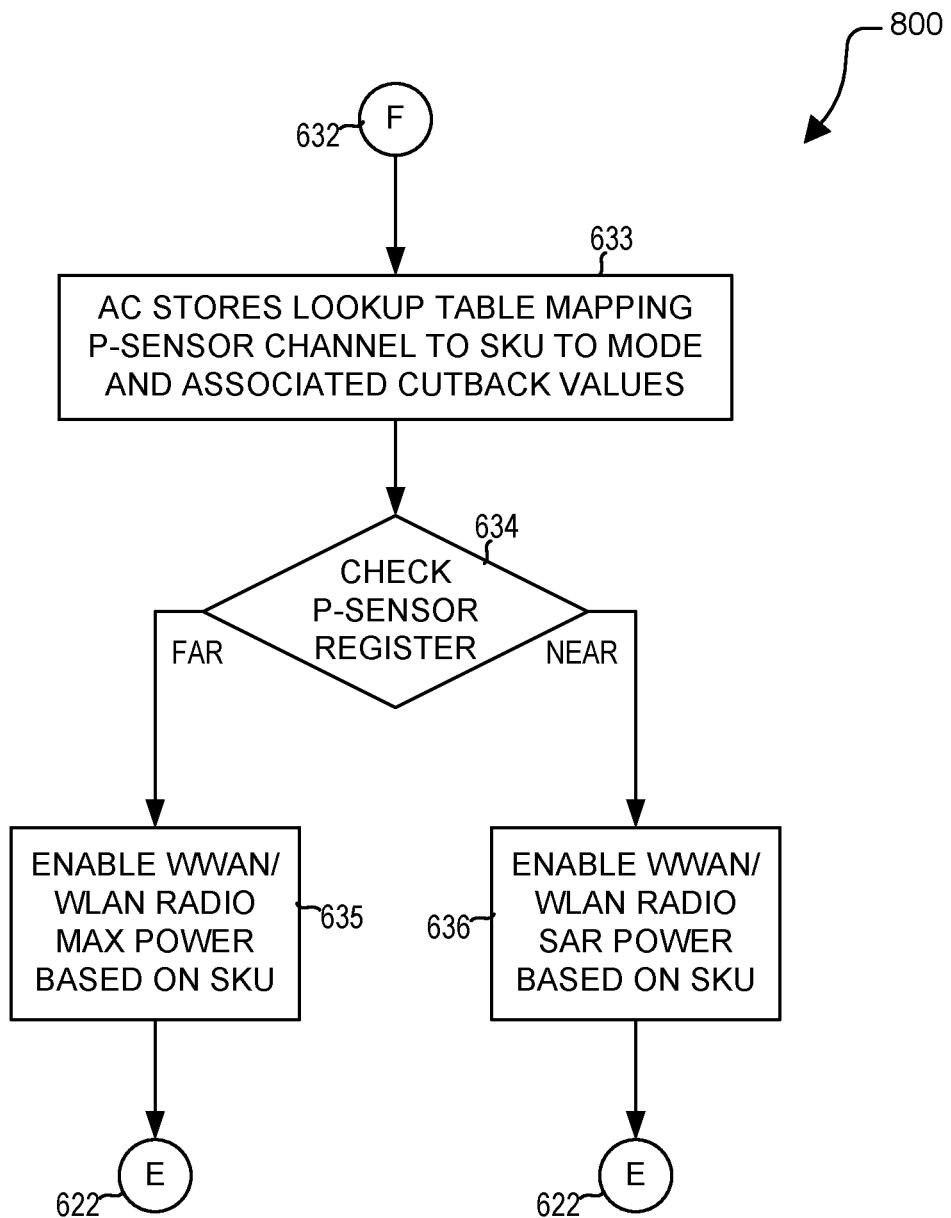

FIGS. 6, 7, and 8, taken together, are a flow diagram illustrating a method for dynamic multiple antenna sensor and wireless power management for multiple radio types and multiple wireless configurations according to an embodiment of the present disclosure. Method 600 begins at block 601, where the IHS is booted, initializing its operation, the embedded controller (EC) in the IHS powers up, initializing its operation, and the AC, including its microcontroller unit (MCU), initializes its operation. From block 601, method 600 continues to block 602. At block 602, the EC reads and verifies an antenna controller (AC) firmware (FW) version from the MCU of the AC. From block 602, method 600 continues to decision block 603. At decision block 603, a decision is made as to whether or not the AC FW version matches the EC FW version.

If the AC FW version does not match the EC FW version, method 600 continues to block 604. At block 604, the EC updates the AC FW and initiates a reset of the MCU of the AC. From block 604, method 600 returns to decision block 603. If, at decision block 603, the AC FW version is determined to match the EC FW version, such that the AC FW version is compatible with the EC FW version, method 600 continues to block 605. At block 605, the EC informs the antenna controller of the system operating mode information. From block 605, method 600 continues to decision block 606. At decision block 606, a decision is made as to whether or not the IHS is in a production mode. If not (for example if the IHS is in a manufacturing mode, such as may occur in a factory), method 600 continues to block 607.

At block 607, telemetry and diagnostics of an AC via a platform hub controller (PCH) using an inter-integrated-circuit (I2C) interface is used to provide manufacturer-mode support. From block 607, method 600 continues to block 610. If, at decision block 606, the IHS is determined to be in a production mode (for example as may occur when the IHS is in normal use by an end user), method 600 continues to block 608. At block 608, the PCH I2C communications path and AC telemetry are disabled. From block 608, method 600 continues to block 610. Block 610 can also be reached from reference A 609 arriving from FIG. 7, from reference B 612 arriving from FIG. 7, or from block 617. At block 610, the AC reads MCU general input/output (GPIO) pin signals, system configuration (SYS-CFG) parameter values, an a subsystem identifier (SSID) to determine the SKU and physical configuration usage mode (for example notebook mode vs. tablet mode) of the IHS. The SSID is a value that identifies a physical instantiation of an IHS, for example, the type (e.g., model) of IHS and the components it comprises. The SSID can be stored, for example, in a BIOS or EC of the IHS, so the AC can read the SSID from the BIOS or EC to identify the physical instantiation (e.g., the model of IHS and components it comprises). The SYS-CFG is a value that can be read by an analog-to-digital converter (ADC), which can sample a voltage level and infer an appropriate binary (e.g., hexadecimal) value (e.g., word), which can be used to uniquely identify an IHS. AC 201 can infer SKU information from the SSID. The SSID information can be provided to AC 201 in the form of a lookup-table (LUT), general purpose input/output (GPIO), SYS-CFG, or inter-integrated circuit (I2C) based message, for example, as a number of bytes within such a message.

As examples, the SKU can pertain to an active antenna SKU for a system in which one or more antennas can be controlled (for example tuned) by the AC or a passive antenna SKU for a system in which antenna parameters cannot be controlled (for example, tuned) by the AC. From block 610, method 600 continues to block 611. At block 611, the AC loads a P-sensor register file based on the SKU and the physical configuration usage mode. From block 611, method 600 continues to decision block 613. At decision block 613, a decision is made as to whether or not P-sensor initialization has been successful. Such a decision can be made based on communication of the AC with the P-sensor to verify configuration details of the P-sensor that reflect proper initialization. If the decision is made at decision block 613 that the P-sensor initialization was not successful, method 600 continues to block 615.

At block 615, a failsafe notification is triggered for a WWAN radio or a WLAN radio based on the SKU of the components used in the wireless subsystem. The dynamic power reduction (DPR) general-purpose input/output (GPIO) pins are set to levels to configure the radio to operate at reduced radio transmit power level. For example, the reduced radio transmit power level can be implemented by a WWAN/WLAN radio by causing the radio to select use of a low-power power table. Thus, the AC can cause the radio to transmit a wireless signal at a failsafe radio transmit power level in response to the failsafe notification. From block 615, method 600 continues to reference D 616, which leads to FIG. 7, where the sending of a HB message to the WWAN/WLAN radio can be stopped.

If a heartbeat (HB) message is not used, for example, in a passive antenna configuration, method 600 can proceed from block 615 to block 617, where a waiting period of T milliseconds elapsed, then method 600 continues to block 610. P-sensor initialization can be reattempted periodically (for example every ten seconds) for some number of retries (for example five retries). If, at decision block 613, a decision is made that the P-sensor initialization was successful, method 600 continues to reference C 614, which leads to FIG. 7.

On FIG. 7, from reference C 614, method 600 continues to block 621. At block 621, a proximity sensor connected interrupt is enabled, allowing the P-sensor to generate interrupts, and the P-sensor is started. The P-sensor connected interrupt is generated in connection with a P-sensor, such as P-sensor 202. Multiple instances of p-sensor 202 can generate multiple instances of the P-sensor connected interrupt. The P-sensor is configured with the selected P-sensor register file loaded by the AC. A reset of the P-sensor integrated circuit (IC) is performed, an identifier (ID) of the P-sensor IC is read, a series of I2C writes and reads are performed with respect to the P-sensor IC, and the P-sensor is started. Dynamic power reduction (DPR) GPIO pin signals are set appropriately. All radios are set to maximum power. A timer is started. At this point, the sending of a heartbeat (HB) message to the WWAN radio can begin.

From block 621, method 600 continues to decision block 623. Method 600 can also arrive at decision block 623 from reference E 622, arriving from FIG. 8, as well as from decision block 625, decision block 626, block 629, or block 631, as will be discussed further below. A sub-process comprising decision block 623 provides, at a short time interval, such as once every second, a check for a change of mode information representative of a change of the physical configuration usage mode of the IHS is performed. At decision block 623, a decision is made as to whether or not a P-sensor trigger interrupt has occurred. If not, method 600 continues to decision block 624. At decision block 624, a decision is made as to whether or not the timer has reached a time greater than or equal to one second. If so, method 600 continues to decision block 625.

At decision block 625, a decision is made as to whether or not a physical configuration usage mode change has occurred, such as a change between a notebook mode and a tablet mode. If not, method 600 returns to decision block 623. If so, method 600 continues to reference B 612, which leads back to FIG. 6, specifically to block 611 on FIG. 6. If, at decision block 624, the decision was made that the timer has not reached a time greater than or equal to one second, method 600 continues to decision block 626. A sub-process comprising decision block 626 provides, at a longer time interval, such as every ten seconds, a P-sensor ID is read to ensure I2C connectivity and a plurality of critical registers of the P-sensor registers are read to match with information obtained at block 610. At decision block 626, a decision is made as to whether or not the timer has reached a time greater than or equal to a specified value of N seconds.

If not, method 600 returns to decision block 623. If so, method 600 continues to decision block 627. At decision block 627, a decision is made as to whether or not the P-sensor is operational. If not, method 600 continues to block 628, which can also be reached via reference D 616 from FIG. 6. At block 628, the heartbeat (HB) messages to the EC and to the WLAN radio are stopped. From block 628, method 600 continues via reference A 609 back to FIG. 6, specifically to block 610 of FIG. 6. If, at decision block 627, the P-sensor is determined to be operational, method 600 continues to block 629. At block 629, the sending of HB messages to the EC and to the WLAN radio is enabled. From block 629, method 600 returns to decision block 623.

If, at decision block 623, a decision is made that the P-sensor trigger interrupt has occurred, method 600 continues to decision block 630. At decision block 630, the interrupt request for the proximity sensor connected interrupt is cleared, and the reason for the interrupt is determined. Examples of possible reasons for the interrupt include triggering of the P-sensor, P-sensor integrated circuit (IC) reset, and steady-state detection. As an example, the reason for an activation of a P-sensor connected interrupt can be determined based on monitoring proximity sensing information from one or more P-sensors channels, which may be sensed using one or more P-sensor ICs. As an example, one P-sensor can provide sensing for a plurality of proximity sensing conductors and can provide proximity sensing information for a corresponding plurality of P-sensor channels.

If proximity sensing information is provided by one or a localized few P-sensor channels, a proximity detection event can be inferred to have occurred. If proximity sensing information is provided by many P-sensor channels or over a large area, such as an entire panel, of an IHS, a steady-state detection can be inferred to have occurred. If no proximity sensing information is provided, another type of event, such as a P-sensor IC reset event can be inferred to have occurred. If the reason is determined to be a reset of the P-sensor IC, method 600 continues to reference A 609, which leads back to FIG. 6, specifically to block 610 of FIG. 6. In such case, blocks 610 and 611 and decision block 613 can be repeated to attempt to reinitialize the P-sensor. If the reason is determined to be a steady-state detection, method 600 continues to block 631.

At block 631, an appropriate channel or all channels are calibrated based on the SKU. Steady-state detection can occur, for example, because of antenna proximity to a non-human object, such as a table, which does not raise SAR compliance concerns. A MCU of the AC can perform steady-state detection on one or more channels, which can involve a plurality of P-sensors and a plurality of proximity sensing conductors for one or more P-sensors. By performing P-sensor channel calibration at block 631, one or more P-sensor channels can be calibrated to ignore sensing of an inanimate object proximate to an antenna subsystem of an IHS. From block 631, method 600 returns to decision block 623. If, at decision block 630, the reason is determined to be the triggering of a proximity sensor, method 600 continues to reference F 632, which leads to FIG. 8, specifically to block 633 of FIG. 8.

On FIG. 8, method 600 continues form reference F 632 to block 633. At block 633, the AC stores a lookup table mapping a P-sensor channel to the SKU, to the mode, and to the associated cutback values. Information can be sent to the EC, the EC can raise a request with the BIOS, the BIOS can communicate to WiFi driver, and the WiFi driver can cut back power on single or multiple antennas. From block 633, method 600 continues to decision block 634. The P-sensor can store a value in a P-sensor register representative of one of a plurality of levels of proximity sensing, which can be used to determine how near or how far a person may be from a proximity sensing conductor. The value in the P-sensor register can be set, for example, as part of the generation of an interrupt by the P-sensor, allowing the reading of the P-sensor register during the servicing of the interrupt to obtain information about the nature of the interrupt.

Such information can inform decisions, such as those of decision blocks 630 and 634. At decision block 634, a decision is made as to whether the P-sensor register indicates someone to be near to the proximity sensor or far from the proximity sensor conductor. If the P-sensor register indicates someone to be far from the proximity sensor conductor, method 600 continues to block 635. At block 635, the WWAN radio or WLAN radio is enabled to operate at a maximum power level using a full-power power table according to the appropriate SKU of the equipment. As an example, GPIOs can be set to levels to select a maximum power level. From block 635, method 600 continues to reference E 622, which leads back to FIG. 7, specifically to decision block 623 of FIG. 7. If, at decision block 634, the P-sensor register indicates someone to be near to the proximity sensor conductor, method 600 continues to block 636.

At block 636, the WWAN radio or WLAN radio is enabled to operate at a specific-absorption-rate (SAR)

reduced power level using a SAR power table according to the appropriate SKU of the equipment. As an example, GPIOs can be set to levels to cutback the power to SAR-compliant power levels. From block 636, method 600 continues to reference E 622, which leads back to FIG. 7, specifically to decision block 623 of FIG. 7.

In accordance with at least one embodiment, an intelligent and dynamic multi-antenna sensor and wireless power management for a multi-radio-access-technology (multi-RAT), multi-SKU IHS is provided. In accordance with at least one embodiment, a system and method to manage multiple P-Sensors & wireless power cut back for multiple radio access technologies across multiple SKUs under a single BIOS are provided. As an IHS is called upon to support an increasing range of wireless communication technologies, such as multiple radio access technologies (multi-RAT), as may include, for example, one or more WWAN radios, one or more WLAN radios, and other types of radios, additional complications can arise. For example, multiple frequency bands and modulation techniques with spatial relationships can involve multiple antennas compatible with different frequency bands, to provide multiple input and multiple output (MIMO) antenna configurations, to avoid radio-frequency (RF) desensitization, and for other reasons. Different regulatory criteria may apply to different components of wireless subsystems, and the interaction of physical configuration usages modes of an IHS, relationships of a user of the IHS to the IHS, and other considerations may affect parameters involved in assuring regulatory compliance. Accordingly, a system and method for managing IHS operation that can include multiple P-Sensors, multi-RAT, multiple simultaneous transmissions, and multiple SKUs is provided.

In accordance with at least one embodiment, dynamic P-Sensor configuration is performed based on RATs & SKUs of a wireless subsystem. A hardware interface is provided between the MCU of the AC, the P-sensor, and system inputs providing SKU detection, allowing proximity sensing information and system configuration information to be used by the AC for management of the wireless subsystem.

An IHS can utilize multi-RAT radios (for example 4G, 5G, WLAN, etc.) exhibiting simultaneous transmission using multiple antennas to support various modes of transmission (for example uplink (UL) MIMO, 5G EN-DC, etc.). With 5G, systems utilize 4×4 antennas, while WLAN supports 2×2 antennas, resulting in a total of six antennas, out of which two of the WWAN 5G antennas transmit to support EN-DC mode, while two of the WLAN antennas simultaneously transmit during an UL MIMO operation, totaling to four transmit antennas in the system. In accordance with at least one embodiment, the AC provides P-sensor-based power cutback for WWAN radios and WLAN radios and can vary the cutback between physical configuration usage mode, such as a notebook mode and a table mode.

Capacitive-sensing-based P-sensor detection can use an antenna as a sensing element. Antennas are connected using coaxial cables, which can exhibit a desired characteristic impedance to maximize power transfer by maintaining a concentric relationship of conductors with intervening dielectric material. The formation of two conductors separated by a dielectric material forms a capacitive structure. When a coaxial cable is used to carry capacitance information back to a P-sensor IC, the capacitance of the coaxial cable itself can interfere with the capacitive sensing of objects in proximity to the antenna or proximity sensing conductor connected to the coaxial cable. With multiple antennas covering multiple radios, multiple bands, and multiple communications protocols, placement of the multiple antennas around an IHS can involve substantial lengths of coaxial cable if a single P-sensor IC were to provide sensing for many antennas. As cable capacitance is proportional to length, the dilution of the antenna capacitance change for which detection is desired by the addition of coaxial cable self-capacitance can affect the sensitivity and detection range of the P-sensor IC. A plurality of distributed P-sensor ICs placed at diverse locations within the IHS to be closer to the antennas for which they are providing proximity sensing can minimize the sensing cable lengths to yield low antenna self-capacitance and improve the sensitivity and detection range of the proximity sensing provided.

As an IHS can support multiple antenna SKUs, such as WLAN passive, WLAN active, 5G+WLAN, 4G+WLAN, etc., combined in a 180/360 form factor, different antenna designs can affect the sensing capacitance, so a plurality of P-sensor IC calibration files can be provided, from which an appropriate one or more can be selected for detection. Mapping and managing P-sensor ICs and their calibrations against RATs, antenna SKUs, platform SKUs, for a plurality of physical configuration usage modes, under a single BIOS, can be provided by at least one embodiment.

In accordance with at least one embodiment, a multi-antenna, multi-sensor management control system is provided that adapts wireless transmission and performance across 4G, 5G, WLAN radios both during stand-alone as well as co-existence operation. At least one embodiment maps a P-Sensor to WLAN antenna SKUs, notifying the radio of a proximity event of the active or passive antennas to ensure appropriate power tables are being used for optimized performance per SKU. At least one embodiment dynamically configures the P-sensor calibration, detecting the WLAN active or passive antennas assembled via an input from an active antenna flex conductor to the AC. At least one embodiment implements varying levels of cutback based on active or passive antenna SKU detection. A proximity event can be triggered in either a notebook (180-degree) or tablet (360-degree) mode, and cutback can be provided. Cutback can be regulated at varying levels for a first antenna and a second antenna, given that the exposure levels can vary based on antenna location and antenna type. No cutback need be implemented in a lid closed mode, so at least one embodiment can use sensing of the closure of a lid of a notebook computer to cause selection of power tables corresponding to maximum power. At least one embodiment assures system performance is fully optimized by tailoring cutback at an antenna SKU level, per antenna, when there is proximity in a 180 or 360 mode, while providing full power in a lid-closed mode of operation. At least one embodiment can manage a single P-sensor for a WWAN SKU but not a WLAN SKU. At least one embodiment can configure and manage multi P-sensors for WWAN, WLAN passive, WLAN active antenna SKUs, or subcombinations thereof.

In accordance with at least one embodiment, a method includes enabling, by an antenna controller (AC), a proximity sensor (P-sensor) connected interrupt to be generated by a P-sensor; upon activation of the P-sensor connected interrupt, determining, at the AC, a reason for the P-sensor connected interrupt; when the reason is a steady-state detection event, calibrating, by the AC, the P-sensor; when the reason is a proximity detection event, storing, by the AC, a radio transmit power lookup table, the radio transmit power lookup table mapping a P-sensor channel, an antenna subsystem physical configuration value, and an information handling system (IHS) physical configuration usage mode value to a radio transmit power level value; and configuring, at a radio, the radio to operate at a radio transmit power level corresponding to the radio transmit power level value. The P-sensor connected interrupt is generated in connection with a P-sensor. The determining of the reason for the P-sensor connected input can be performed by monitoring proximity sensing information provided by the P-sensor. If proximity sensing information is provided by one or a localized few proximity sensor channels, a proximity detection event can be inferred to have occurred. If proximity sensing information is provided by many proximity sensor channels or over a large area, such as an entire panel, of an IHS, a steady-state detection can be inferred to have occurred. If no proximity sensing information is provided, another type of event, such as a P-sensor IC reset event can be inferred to have occurred. In accordance with at least one embodiment, the method further includes, when the reason is a P-sensor reset, reinitializing the P-sensor. In accordance with at least one embodiment, the method further includes determining whether the P-sensor is operational; when the P-sensor is operational, sending a heartbeat (HB) message from the AC to the radio; and, when the P-sensor is not operational; inhibiting the sending of the HB message from the AC to the radio. In accordance with at least one embodiment, the method further includes obtaining, by the AC, the antenna subsystem physical configuration value and the IHS physical configuration usage mode value; storing, by the AC, information based on the antenna subsystem physical configuration value and the IHS physical configuration usage mode value in a P-sensor register file of the P-sensor; and, upon the proximity detection event, reading the P-sensor register file, wherein the configuring the radio to operate at the radio transmit power level is based on the antenna subsystem physical configuration value stored in the P-sensor register file. In accordance with at least one embodiment, the method further includes determining, at the AC, whether the P-sensor is successfully initialized; when the P-sensor is determined not to be successfully initialized, triggering, at the AC, a failsafe notification to the radio; and transmitting, at the radio, a wireless signal at a failsafe radio transmit power level in response to the failsafe notification. In accordance with at least one embodiment, the calibrating, by the AC, the P-sensor includes calibrating, by the AC, the P-sensor to ignore sensing of an inanimate object proximate to an antenna subsystem. In accordance with at least one embodiment, the enabling, by the antenna controller (AC), the proximity sensor (P-sensor) connected interrupt to be generated by the P-sensor includes configuring, at the radio, the radio to operate at a maximum radio transmit power level.

In accordance with at least one embodiment, an information handling system (IHS) comprises an antenna subsystem; a proximity sensor (P-sensor) for sensing proximity to the antenna subsystem; and an antenna controller; and a radio. The antenna controller is configured to enable a proximity sensor (P-sensor) connected interrupt to be generated by a P-sensor; upon activation of the P-sensor connected interrupt, to determine a reason for the P-sensor connected interrupt; when the reason is a steady-state detection event, cause calibrating of the P-sensor; when the reason is a proximity detection event, to storing, a radio transmit power lookup table, the radio transmit power lookup table mapping a P-sensor channel, an antenna subsystem physical configuration value, and an information handling system (IHS) physical configuration usage mode value to a radio transmit power level value. The radio is configured to operate at a radio transmit power level corresponding to the radio transmit power level value. In accordance with at least one embodiment, the AC is further configured to, when the reason is a P-sensor reset, reinitialize the P-sensor. In accordance with at least one embodiment, the AC is further configured to determine whether the P-sensor is operational; when the P-sensor is operational, to send a heartbeat (HB) message from the AC to the radio; and, when the P-sensor is not operational; to inhibit the sending of the HB message from the AC to the radio. In accordance with at least one embodiment, the AC is further configured to obtain the antenna subsystem physical configuration value and the IHS physical configuration usage mode value; to store information based on the antenna subsystem physical configuration value and the IHS physical configuration usage mode value in a P-sensor register file of the P-sensor; and, upon the proximity detection event, to read the P-sensor register file, wherein the configuring the radio to operate at the radio transmit power level is based on the antenna subsystem physical configuration value stored in the P-sensor register file. In accordance with at least one embodiment, the AC is further configured to determining whether the P-sensor is successfully initialized; when the P-sensor is determined not to be successfully initialized, to trigger a failsafe notification to the radio; and wherein the radio is further configured to operate at a failsafe radio transmit power level in response to the failsafe notification. In accordance with at least one embodiment, the AC is further configure to calibrate the P-sensor to ignore sensing of an inanimate object proximate to the antenna subsystem. In accordance with at least one embodiment, the AC is further configured, upon enabling the proximity sensor (P-sensor) connected interrupt to be generated by the P-sensor, to cause the radio the radio to operate at a maximum radio transmit power level.

In accordance with at least one embodiment, a method comprises enabling, by an antenna controller (AC), a proximity sensor (P-sensor) connected interrupt to be generated by a P-sensor of a plurality of P-sensors; upon activation of the P-sensor connected interrupt, determining, at the AC, a reason for the P-sensor connected interrupt; when the reason is a steady-state detection event, calibrating, by the AC, the P-sensor; when the reason is a proximity detection event, storing, by the AC, a radio transmit power lookup table, the radio transmit power lookup table mapping a P-sensor channel, an antenna subsystem physical configuration value, and an information handling system (IHS) physical configuration usage mode value to a radio transmit power level value; and configuring, at a radio, the radio to operate at a radio transmit power level corresponding to the radio transmit power level value. In accordance with at least one embodiment, the method further comprises, when the reason is a P-sensor reset, reinitializing the P-sensor. In accordance with at least one embodiment, the method further comprises determining whether the P-sensor is operational; when the P-sensor is operational, sending a heartbeat (HB) message from the AC to the radio; and, when the P-sensor is not operational; inhibiting the sending of the HB message from the AC to the radio. In accordance with at least one embodiment, the method further comprises obtaining, by the AC, the antenna subsystem physical configuration value and the IHS physical configuration usage mode value; storing, by the AC, information based on the antenna subsystem physical configuration value and the IHS physical configuration usage mode value in a P-sensor register file of the P-sensor; and, in conjunction with the proximity detection event, reading the P-sensor register file, wherein the configuring the radio to operate at the radio transmit power level is based on the antenna subsystem physical configuration value stored in the P-sensor register file. In accordance with at least one embodiment, the method further comprises determining, at the AC, whether the P-sensor is successfully initialized; when the P-sensor is determined not to be successfully initialized, triggering, at the AC, a failsafe notification to the radio; and transmitting, at the radio, a wireless signal at a failsafe radio transmit power level in response to the failsafe notification. In accordance with at least one embodiment, the calibrating, by the AC, the P-sensor comprises calibrating, by the AC, the P-sensor to ignore sensing of an inanimate object proximate to an antenna subsystem.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, the information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. Information handling systems can also include one or more buses operable to transmit information between the various hardware components.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device).

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    enabling, by an antenna controller (AC), a proximity sensor (P-sensor) connected interrupt to be generated by a P-sensor;
    upon activation of the P-sensor connected interrupt, determining, at the AC, a reason for the P-sensor connected interrupt;
    when the reason is a steady-state detection event, calibrating, by the AC, the P-sensor, to ignore sensing of an inanimate object proximate to an antenna subsystem;
    when the reason is a proximity detection event, storing, by the AC, a radio transmit power lookup table, the radio transmit power lookup table mapping a P-sensor channel, an antenna subsystem physical configuration value, and an information handling system (IHS) physical configuration usage mode value to a radio transmit power level value; and
    configuring, at a radio, the radio to operate at a radio transmit power level corresponding to the radio transmit power level value.

2. The method of claim 1 further comprising, when the reason is a P-sensor reset, reinitializing the P-sensor.

3. The method of claim 1 further comprising:
determining whether the P-sensor is operational;
when the P-sensor is operational, sending a heartbeat (HB) message from the AC to the radio; and
when the P-sensor is not operational; inhibiting the sending of the HB message from the AC to the radio.

4. The method of claim 1 further comprising:
obtaining, by the AC, the antenna subsystem physical configuration value and the IHS physical configuration usage mode value;
storing, by the AC, information based on the antenna subsystem physical configuration value and the IHS physical configuration usage mode value in a P-sensor register file of the P-sensor; and
upon the proximity detection event, reading the P-sensor register file, wherein the configuring the radio to operate at the radio transmit power level is based on the antenna subsystem physical configuration value stored in the P-sensor register file.

5. The method of claim 1 further comprising:
determining, at the AC, whether the P-sensor is successfully initialized;
when the P-sensor is determined not to be successfully initialized, triggering, at the AC, a failsafe notification to the radio; and
transmitting, at the radio, a wireless signal at a failsafe radio transmit power level in response to the failsafe notification.

6. The method of claim 1, wherein the enabling, by the antenna controller (AC), the proximity sensor (P-sensor) connected interrupt to be generated by the P-sensor comprises:
configuring, at the radio, the radio to operate at a maximum radio transmit power level.

7. An information handling system (IHS) comprising:
an antenna subsystem;
a proximity sensor (P-sensor) for sensing proximity to the antenna subsystem;
and an antenna controller (AC), the antenna controller configured to enable a proximity sensor (P-sensor) connected interrupt to be generated by a P-sensor; upon activation of the P-sensor connected interrupt, to determine a reason for the P-sensor connected interrupt; when the reason is a steady-state detection event, cause calibrating of the P-sensor; when the reason is a proximity detection event, to storing, a radio transmit power lookup table, the radio transmit power lookup table mapping a P-sensor channel, an antenna subsystem physical configuration value, and an information handling system (IHS) physical configuration usage mode value to a radio transmit power level value, and when the reason is a P-sensor reset, reinitialize the P-sensor; and
a radio configured to operate at a radio transmit power level corresponding to the radio transmit power level value.

8. The IHS of claim 7, wherein the AC is further configured to determine whether the P-sensor is operational; when the P-sensor is operational, to send a heartbeat (HB) message from the AC to the radio; and, when the P-sensor is not operational; to inhibit the sending of the HB message from the AC to the radio.

9. The IHS of claim 7, wherein the AC is further configured to obtain the antenna subsystem physical configuration value and the IHS physical configuration usage mode value; to store information based on the antenna subsystem physical configuration value and the IHS physical configuration usage mode value in a P-sensor register file of the P-sensor; and, upon the proximity detection event, to read the P-sensor register file, wherein the configuring the radio to operate at the radio transmit power level is based on the antenna subsystem physical configuration value stored in the P-sensor register file.

10. The IHS of claim 7, wherein the AC is further configured to determining whether the P-sensor is successfully initialized; when the P-sensor is determined not to be successfully initialized, to trigger a failsafe notification to the radio; and wherein the radio is further configured to operate at a failsafe radio transmit power level in response to the failsafe notification.

11. The IHS of claim 7, wherein the AC is further configure to calibrate the P-sensor to ignore sensing of an inanimate object proximate to the antenna subsystem.

12. The IHS of claim 7, wherein the AC is further configured, upon enabling the proximity sensor (P-sensor) connected interrupt to be generated by the P-sensor, to cause the radio the radio to operate at a maximum radio transmit power level.

13. A method comprising:
enabling, by an antenna controller (AC), a proximity sensor (P-sensor) connected interrupt to be generated by a P-sensor of a plurality of P-sensors;
upon activation of the P-sensor connected interrupt, determining, at the AC, a reason for the P-sensor connected interrupt;
when the reason is a steady-state detection event, calibrating, by the AC, the P-sensor;
when the reason is a proximity detection event, storing, by the AC, a radio transmit power lookup table, the radio transmit power lookup table mapping a P-sensor channel, an antenna subsystem physical configuration value, and an information handling system (IHS) physical configuration usage mode value to a radio transmit power level value;
configuring, at a radio, the radio to operate at a radio transmit power level corresponding to the radio transmit power level value;
determining whether the P-sensor is operational;
when the P-sensor is operational, sending a heartbeat (HB) message from the AC to the radio; and
when the P-sensor is not operational; inhibiting the sending of the HB message from the AC to the radio.

14. The method of claim 13 further comprising, when the reason is a P-sensor reset, reinitializing the P-sensor.

15. The method of claim 13 further comprising:
obtaining, by the AC, the antenna subsystem physical configuration value and the IHS physical configuration usage mode value;
storing, by the AC, information based on the antenna subsystem physical configuration value and the IHS physical configuration usage mode value in a P-sensor register file of the P-sensor; and
upon the proximity detection event, reading the P-sensor register file, wherein the configuring the radio to operate at the radio transmit power level is based on the antenna subsystem physical configuration value stored in the P-sensor register file.

16. The method of claim 13 further comprising:
determining, at the AC, whether the P-sensor is successfully initialized;
when the P-sensor is determined not to be successfully initialized, triggering, at the AC, a failsafe notification to the radio; and transmitting, at the radio, a wireless signal at a failsafe radio transmit power level in response to the failsafe notification.

17. The method of claim 13, wherein the calibrating, by the AC, the P-sensor comprises:
   calibrating, by the AC, the P-sensor to ignore sensing of an inanimate object proximate to an antenna subsystem.

* * * * *